(12) United States Patent
Chahine et al.

(10) Patent No.: US 8,424,922 B2
(45) Date of Patent: Apr. 23, 2013

(54) ANGLED FLEXIBLE COUPLING WITH INTEGRAL OUTER SHIELD AND/OR INNER LINER

(75) Inventors: Paul Chahine, Dacula, GA (US); Gerhard Lein, Karlsruhe-Palmbach (DE); Rolf Janssen, Atlanta, GA (US)

(73) Assignee: American BOA, Inc., Cumming, GA (US)

( * ) Notice: Subject to any disclaimer, the term of this patent is extended or adjusted under 35 U.S.C. 154(b) by 162 days.

(21) Appl. No.: 12/693,620

(22) Filed: Jan. 26, 2010

(65) Prior Publication Data

US 2010/0178099 A1 Jul. 15, 2010

Related U.S. Application Data

(63) Continuation-in-part of application No. 12/464,256, filed on May 12, 2009.

(60) Provisional application No. 61/052,662, filed on May 13, 2008.

(51) Int. Cl.
*F16L 21/00* (2006.01)

(52) U.S. Cl.
USPC .................................. 285/226; 285/184

(58) Field of Classification Search .......... 285/226–228, 285/43, 44, 184
See application file for complete search history.

(56) References Cited

U.S. PATENT DOCUMENTS

| 2,444,008 A | 6/1948 | Fentress |
| 2,822,194 A | 2/1958 | Fentress |
| 3,259,405 A * | 7/1966 | Heller .......................... 285/226 |

FOREIGN PATENT DOCUMENTS

| DE | 2700483 | 7/1978 |
| DE | 3809210 | 2/1989 |
| GB | 2129891 | 5/1984 |

* cited by examiner

*Primary Examiner* — Aaron Dunwoody
(74) *Attorney, Agent, or Firm* — Wood, Herron & Evans, LLP

(57) ABSTRACT

A flexible bellows used in a pipe coupling includes composite convolutions having integral extensions forming one or both of an outer shield or inner liner to enhance performance of the coupling. Embodiments incorporate asymmetric convolution forming discs providing for static angled couplings to accommodate offset or misaligned pipe system components.

19 Claims, 18 Drawing Sheets

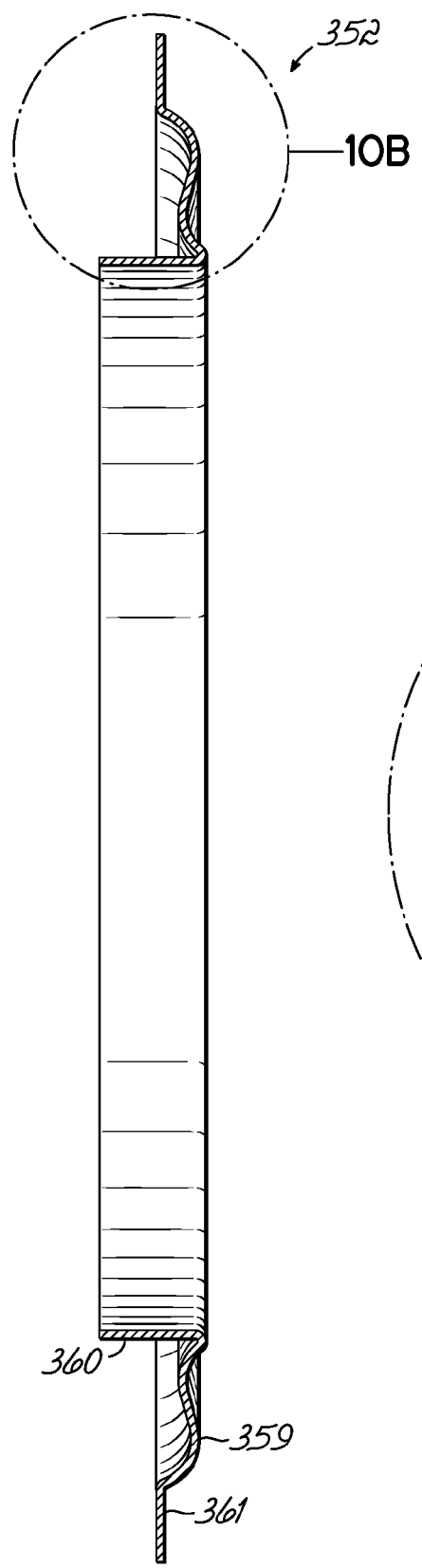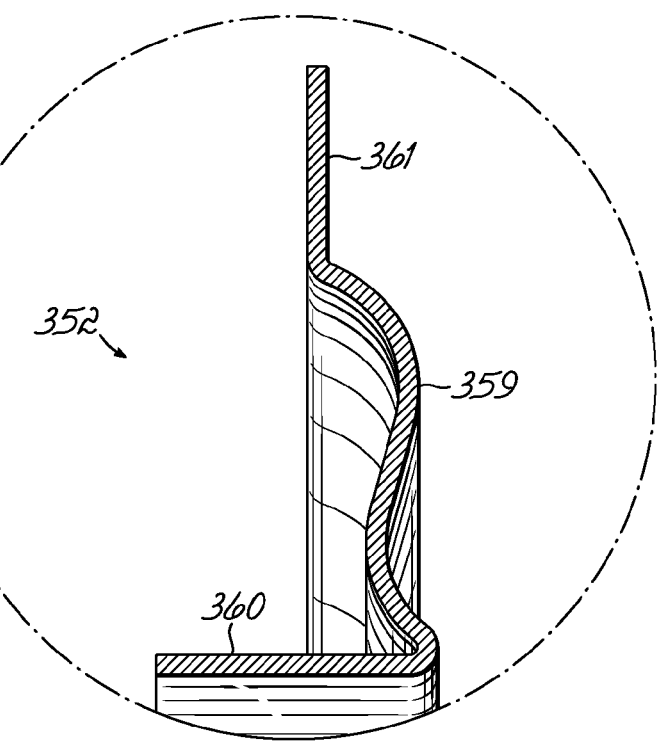
FIG. 10B
FIG. 10A

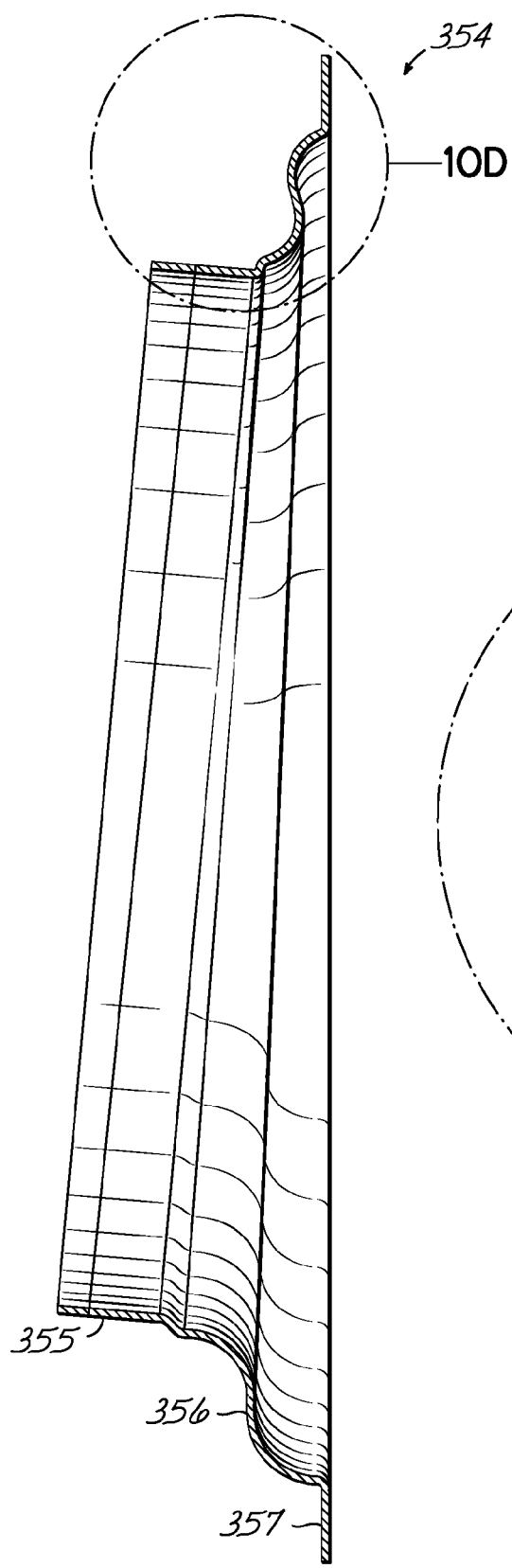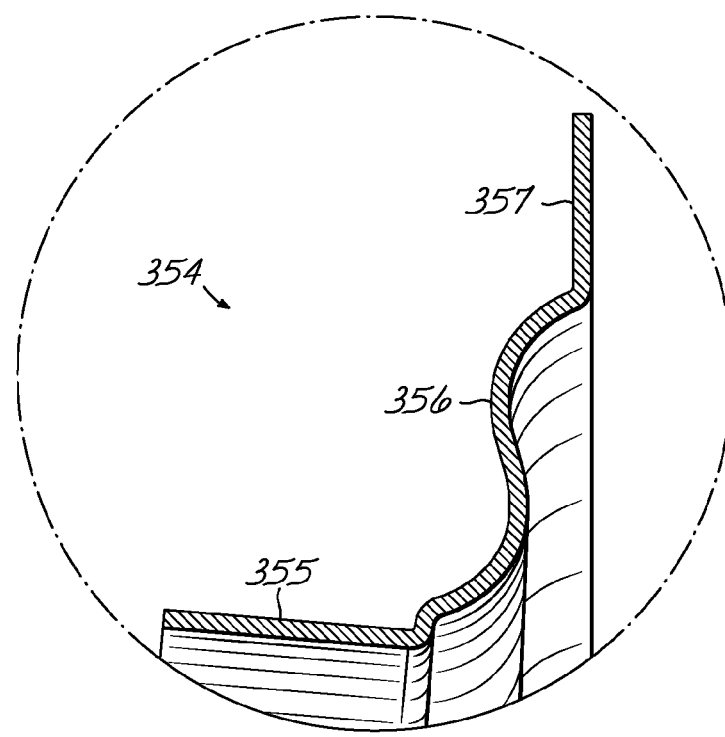
FIG. 10C
FIG. 10D

US 8,424,922 B2

ANGLED FLEXIBLE COUPLING WITH INTEGRAL OUTER SHIELD AND/OR INNER LINER

RELATED APPLICATIONS AND PRIORITY CLAIMS

This application is a continuation-in-part (CIP) application of pending U.S. patent application Ser. No. 12/464,256, filed May 12, 2009, entitled "FLEXIBLE ELEMENT WITH INTEGRAL OUTER SHIELD AND/OR INNER LINER" and which claims priority to U.S. provisional patent application Ser. No. 61/052,662 filed May 13, 2008. Applicant claims the benefit of the filing dates of these two prior applications. The full disclosures of both these prior applications are expressly incorporated herein by reference as if fully and tangibly expressed herein.

FIELD OF THE INVENTION

This invention relates to flexible piping elements and more specifically to couplings for pipes, particularly useful in, but not limited to, couplings for exhaust pipes from internal combustion engines. This invention, with more particularity, relates to such piping elements and couplings where a bend or angled coupling is desired.

BACKGROUND OF THE INVENTION

Couplings for pipes, particularly exhaust pipes, have been known. Prior couplings including bellows with separate inner liners and/or separate outer shields have been used in exhaust pipe environments.

Such environments are harsh. Heat produces or influences thermal changes in such pipes and couplings. Noise, vibration and harshness (hereinafter NVH) are produced by the environment of the exhaust from internal combustion engines must be handled. Motion, in the form of bending, must be accommodated as well, as pressure changes. Aspects of convection cooling affect such pipes and couplings. Mounting points for support and suspension of such couplings vary between applications but many prior couplings are not generally flexible in the location or placement of mounts.

Known coupling apparatus deals with such concerns in a variety of ways, leaving room for a great deal of improvement. Such known apparatus typically requires a separate inner liner to limit compression of the bellows, to reduce the impact of the flowing medium to the bellows, and to reduce turbulence and/or an outer shield to limit extension, to protect the bellows from a harsh environment and to add NVH damping properties. These items, i.e. liner and/or shield are usually added at considerable cost and complexity. Mounting points and hardware require a large variety of designs, adapters and the like.

In the past, bellows have been edge welded. But edge welded bellows do not have integral liners or outer shields and lack flexibility in provisions for mounting. Hydroformed, elastomeric formed, or mechanically formed bellows have been proposed. But these are limited by the material specifications and forming processes and they require separate outer shields and/or inner liners. The same material limitations evident on conventional bellows, also constrains one of its main purposes, that being durability under flexibility. Molded bellows have the same concerns as above. Additional disadvantage of a conventional bellows as described above is the complexity required to mount/hinge support conventional bellows other than on the end of the bellows.

Accordingly, it is desired to uniquely integrate all components: bellows, outer shield, and/or inner liner, mount/hinge) together to overcome and improve the features in the prior known couplings.

It is also desired to provide considerable flexibility in the bellows' convolutions so as to better optimize the overall functionality, particularly in the environmental conditions noted above.

SUMMARY OF THE INVENTION

To these ends, the invention in preferred embodiments includes a flexible element which is the basis for an elastic connection of pipes and which compensates for thermal influences, pressure changes, motion (such as bending), noise, vibration and harshness (NVH), or provides convection cooling and other such benefits.

While existing art contains flexible gas tight elements that consist of a bellows provided with a separate inner liner, and/or a separate outer shield, this invention contemplates a bellows having an integral outer shield and/or an integral inner liner. Several components can be added to this bellows with integral outer shield and/or integral inner liner to achieve additional functionality in a unique structure. The invention can be made with a variety of materials and with any number of homogeneous or variant plies thicknesses of the materials.

The integral construction noted provides a gas tight but flexible connection that is capable of compensating, and performing the benefits of, compensating thermal influences, pressure changes, motion (such as bending), noise vibration and harshness (NVH), and other such environmental conditions.

Such a new concept improves piping system life, NVH compensation assembly ease, available cooling surface and provides flexibility in mounting/hinging points. The invention does this at a lower overall cost by integrating the inner liner and/or the outer shield with the bellows.

Accordingly, the present invention provides a superior and lower cost product with integrated additional functionality like mounting/hinging points.

In more detail, the integral bellows construction of this invention is achieved by adhering (by welding, chemical bonding, or other such method of adhering) two formed (by stamping, molding, cutting or other such forming method) discs together to form a convolution of the bellows. The overlap at the two adhered ends is used to form the outer shield and/or inner liner. Any number of convolutions can be adhered to form a larger and more flexible bellows with an integral outer shield and/or integral inner liner. The configuration of the bellows can take into consideration the number of plies thickness, the various end configuration, the various materials and thicknesses, the overlap geometry for the outer shield or inner liner, and other such variations. The overlap areas (at the ends of the discs) can be modified to add additional features such as a rod or cable to limit extension or provide mounting. Damping material can be added between the convolutions and trapped by the end features to create a bellows assembly with damping properties.

These and other objectives and advantages will be more readily apparent from the following written description of the preferred embodiments and from the drawings in which:

BRIEF DESCRIPTION OF THE DRAWINGS

FIG. 10A is a cross section view of the first uniform disc of the invention of FIG. 10;

FIG. 10B is a detail view of the encircled area 10B of FIG. 10A;

FIG. 10C is a cross section view of the second asymmetric disc of the invention of FIG. 10;

FIG. 10D is a detail view of the encircled area 10D of FIG. 10C;

Center lines "CL" as indicated are shown in selected FIGS. as center lines or axes as appropriate for clarity where the construction is symmetrical thereabout.

DETAILED DESCRIPTION OF THE INVENTION

It should be readily understood that the components and steps of the invention, as generally described and illustrated in the Figures herein and accompanying text, can be arranged and designed in a wide variety of different configurations while still utilizing the inventive concept.

For example, the number of disc members and the convolutions of any bellows can be varied as well as their radial and circumferential extension, overlap configuration and the like.

Thus, the following more detailed description of the preferred embodiments of the system and method for the present invention, as presented in the Figures and accompanying text, is not intended to limit the scope of the invention, as claimed, but it is merely representative of the presently preferred embodiments of the invention. Moreover, it will be understood that the embodiments described are primarily referred to as "bellows" but particularly and preferably comprise couplings for pipes.

The preferred embodiments of the invention will be best understood by reference to the drawings wherein like parts or steps are designated by like numerals throughout. In the FIGS., a dash-dot center line is provided for clarity with the bellows being generally symmetrical thereabout excepting FIGS. 4 and 4A.

Figure 1:
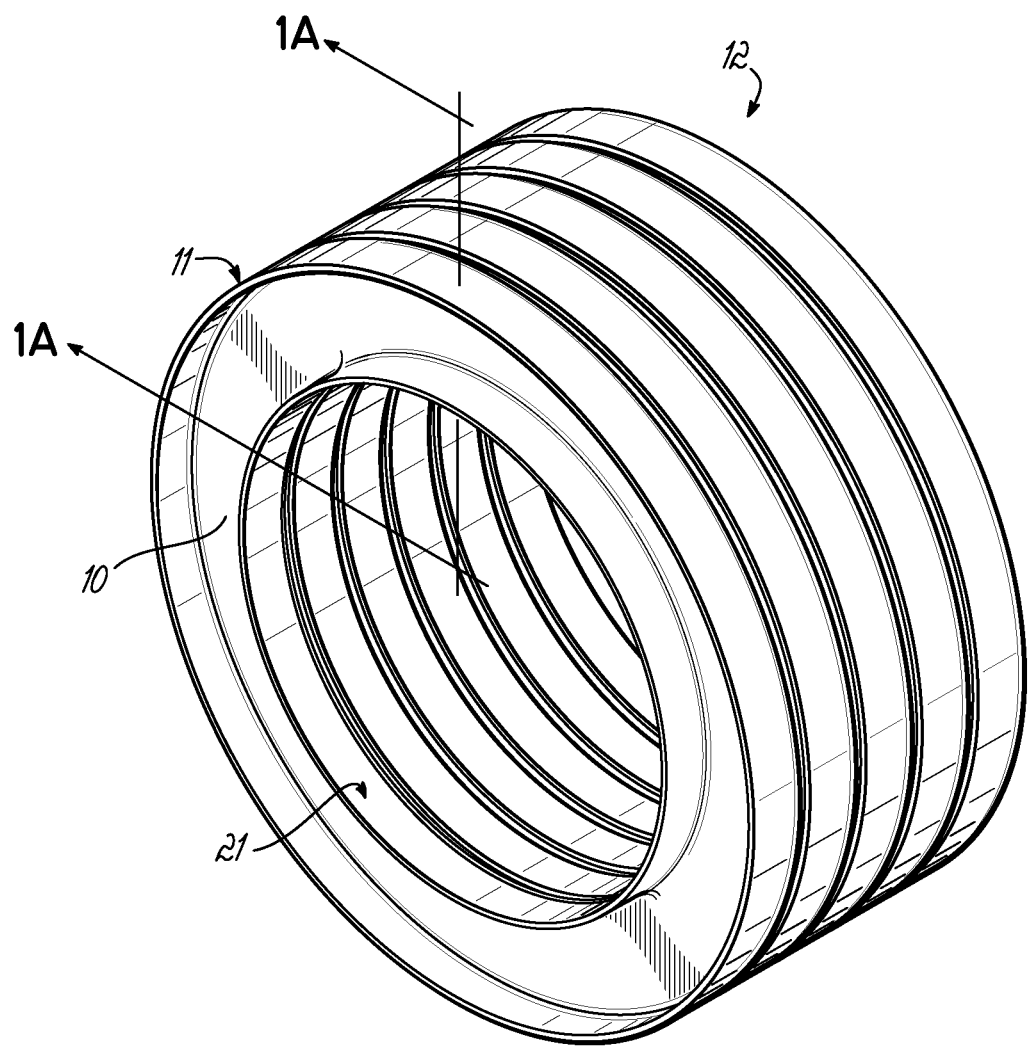
FIG. 1 is an isometric view of one embodiment of the invention with the bellows defining an integral outer shield and integral inner liner.
Figure 1A:
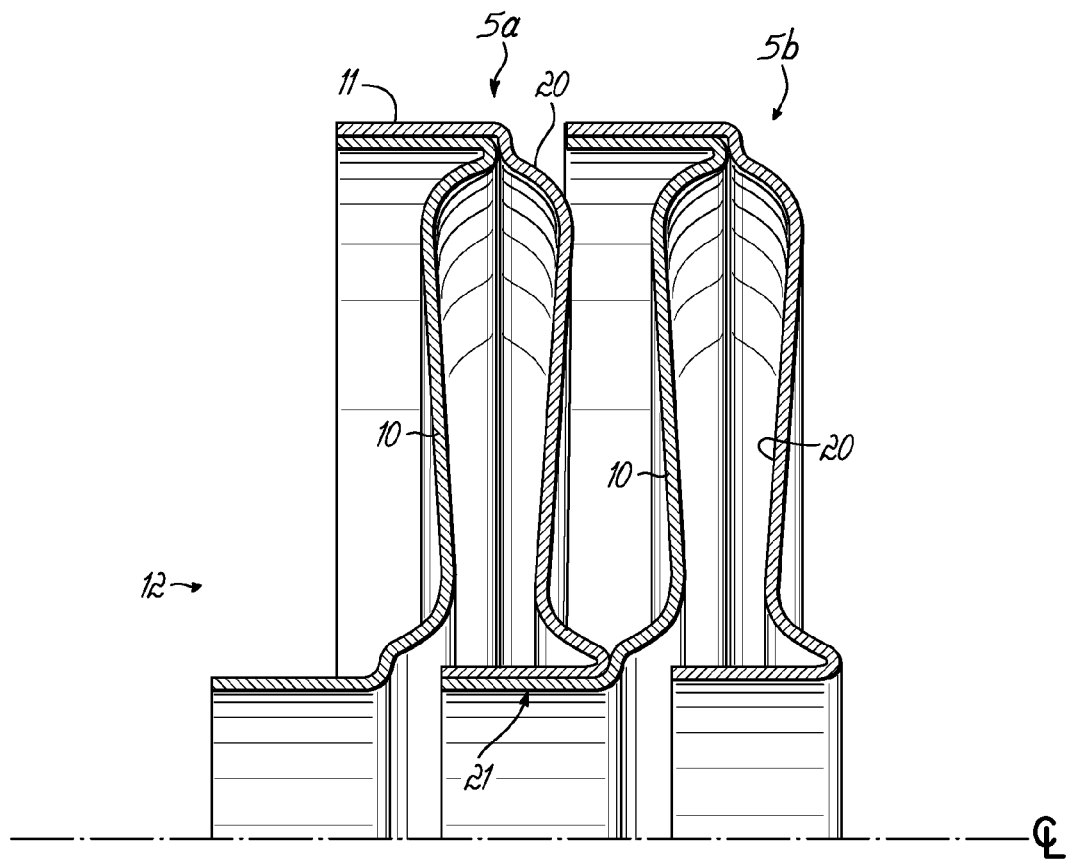
FIG. 1A is a cross-section view of the invention of FIG. 1, along lines 1A-1A of FIG. 1 and showing two convolutions of a multiple convolution bellows with the inner liner and outer shield integrated with the bellows.

FIG. 1 depicts a unitary bellows unit having a plurality of convolutions, each formed by two discs 10, 20 (FIG. 1A).

Referring to FIGS. 1 and 1A, two discs are adhered to form an inner half 10 of a bellows convolution and an outer half 20 of a bellows convolution. Two or more convolutions may be adhered to form a multi-convolution bellows 5. The more convolutions added to the bellows, the larger the range of motion, the longer the durability for set deflections, and the lower the stiffness for NVH compensation properties (among other performance criteria of the bellows).

Referring to FIG. 1A, the overlap of the discs 10 and 20 of one convolution 5a create the integral outer shield 11 and the overlap of disc 20 from convolution 5a and disc 10 from convolution 5b, form integral inner liner 21. The bellows 12 is created by adhering (by welding, chemical bonding, or other such method of adhering) two formed (by stamping, molding, cutting or other such forming method) discs 10, 20 together to form a convolutions of the bellows 12. The overlap at the respective adhered ends is used to form the outer shield 11 and/or inner liner 21. The outer shield 11 serves to provide protection for the bellows 12 from the outside environment and (with additional components) provide extension limits to the bellows. The inner liner 21 serves to protect the bellows 12 from the medium in the piping system, to reduce turbulence and improve NVH properties, and to provide a compression stop.

Figure 1B:
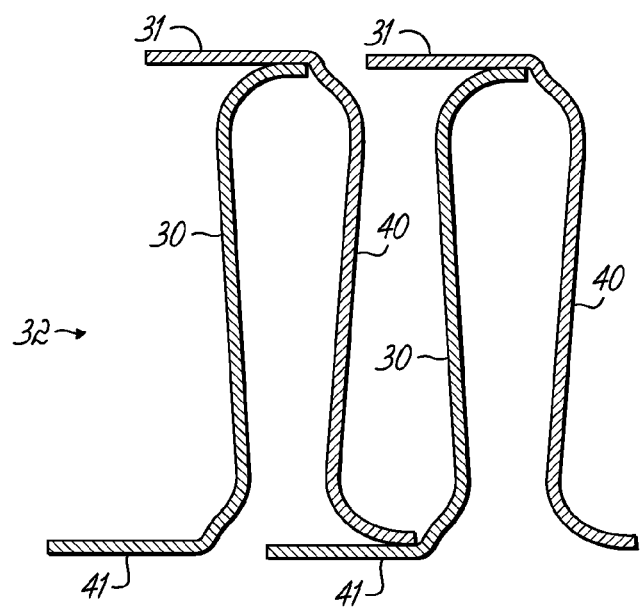
FIG. 1B is a cross-section view similar to FIG. 1A, but of an alternate embodiment of the invention with an alternative bellows disc concept, minimizing the overlap at the ends.

Referring to FIG. 1B, the inner discs 30 and outer discs 40 and the adhesion method can be designed to minimize the overlap of material and reduce material. A single ply outer shield 31 and a single ply inner shield 41 are provided in a bellows 32.

Figure 1C:
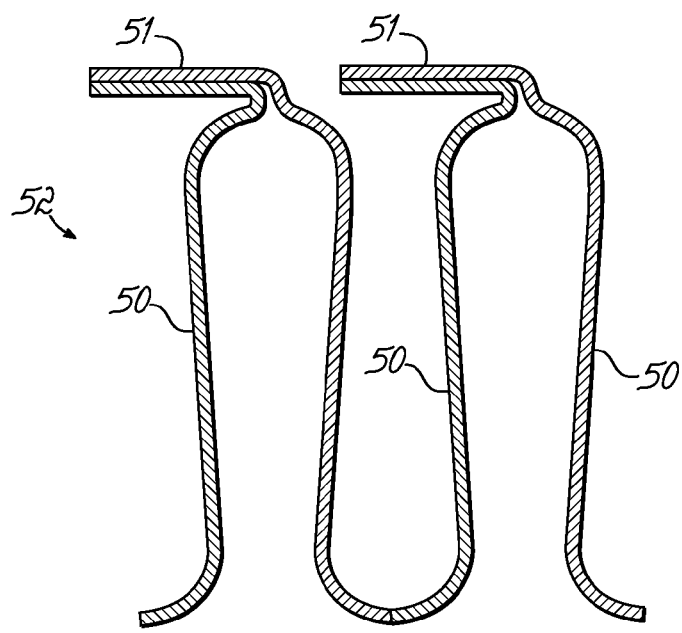
FIG. 1C is a cross-section view similar to FIG. 1A, but of another alternate embodiment of the invention with only an integral outer shield.

Referring to FIG. 1C, the bellows 52 can have inner discs 50 and outer discs 60 to create a bellows 52 with just an outer shield 51.

Figure 1D:
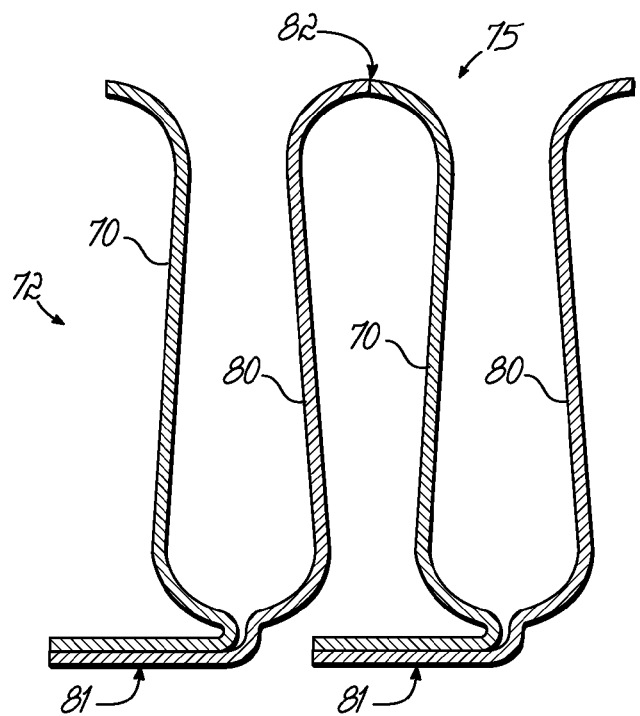
FIG. 1D is a cross-section view similar to FIG. 1A, but of another alternate embodiment of the invention with only an integral inner liner.

Referring to FIG. 1D, the bellows 72 can have inner discs 70 and outer discs 80 to create a bellows 72 with just an inner liner 81. One or more concave convolutions 75 (view from outside bellows 72) define bellows 72, each convolution defined in part by disc 70 and disc 80, joined by welding, for example, at the juncture 82 of the respective discs 70, 80 forming the respective convolution.

Figure 1E:
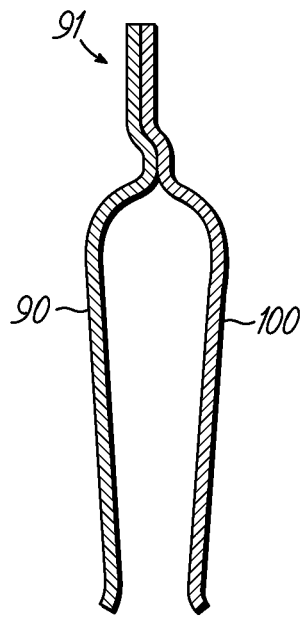
FIG. 1E is a cross-section illustrative view similar to FIG. 1A but of one convolution of a bellows with an alternative overlap end to simplify the forming process after the ends are joined.

Referring to FIG. 1E, the overlap geometry at 91 of respective inner and outer discs 90, 100 can be optimized in a number of ways to facilitate the forming of it (after adhesion) to the inner liner or outer shield as desired. FIG. 1E thus illustrates the intermediate configuration of two discs 90, 100 as initially joined together and awaiting further forming, bending, etc. of the overlap geometry 91.

Figure 1F:
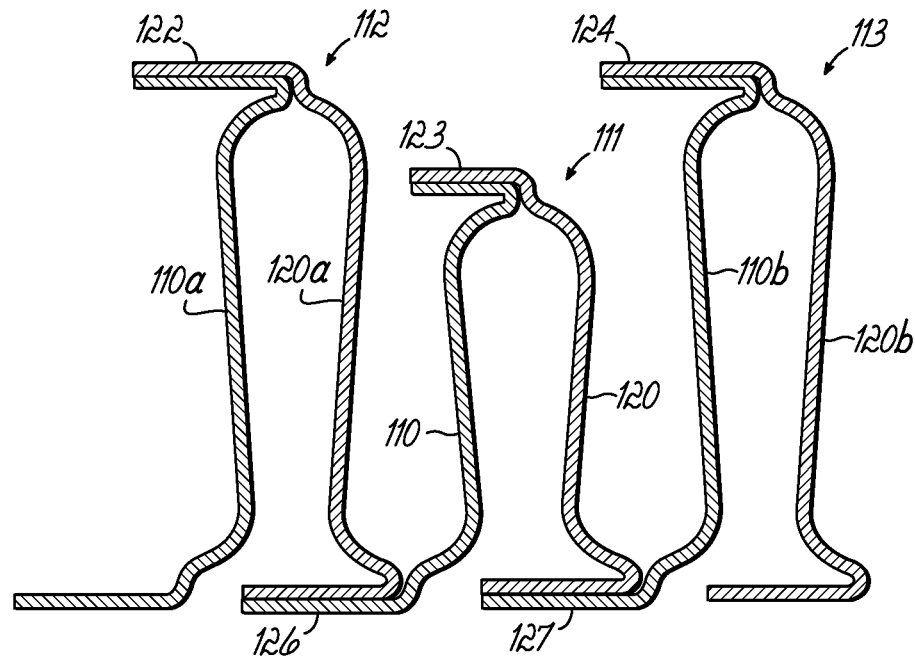
FIG. 1F is a cross-section view similar to FIG. 1A but illustrating an alternate embodiment of the invention with integral outer shields and integral inner liner and showing three convolutions of varied height to facilitate the required movement of the bellows.

FIG. 1F illustrates that the size of the convolutions can be altered to change the properties of the bellows. As in this figure, the smaller convolution 111 with inner disc 110 and outer disc 120 form a convolution that can be nested between the larger ones 112, 113 and allow for greater range of motion (i.e. bending) and NVH properties. Each of the convolutions 111, 112, 113 are formed by respective discs 110, 120; 110a, 120a and 110b, 120b. In this configuration, and for example, overlaps 122, 123, 124 form partial outer shields while overlaps 126, 127 and so on form partial inner liners.

Figure 1G:
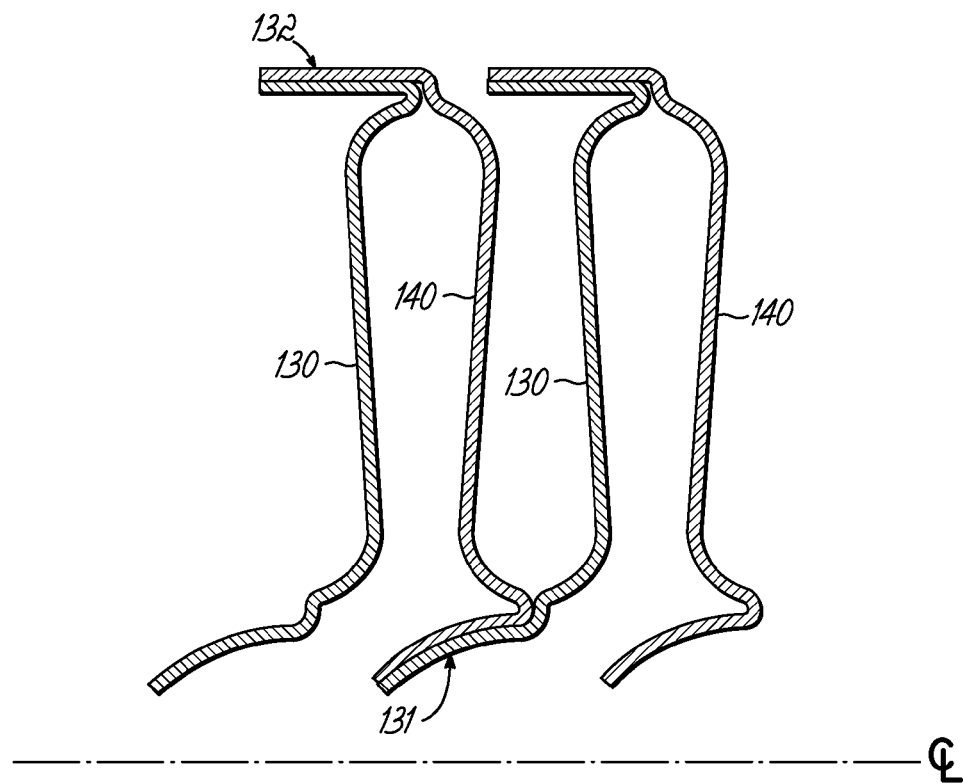
FIG. 1G is a cross-section view similar to FIG. 1A but illustrating an alternate embodiment of the invention with both an integral outer shield and an inner liner, the geometry of the inner liner can be modified to optimize the flow and NVH characteristics of the medium in the piping system, or in the case of the outer shield, the shielding properties.

Referring to FIG. 1G, the geometry of the ends of the inner discs 130 and outer discs 140 can be made in a variety of ways to optimize the inner liner 131 or outer shield for the best functional purpose, as illustrated.

In all of FIGS. 1-1G, it will be appreciated the respective shield and liner components are essentially aligned (excepting shields 122-124 and liner 131).

Figure 2:
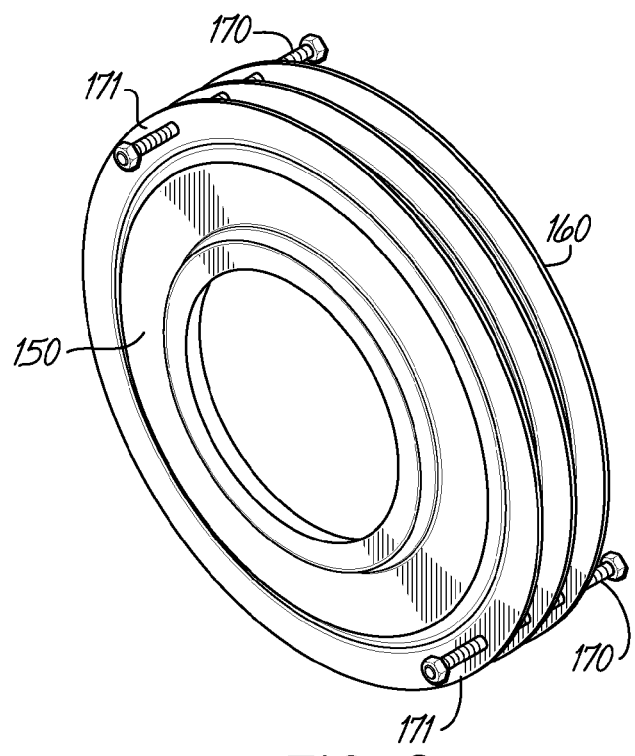
FIG. 2 is an isometric view of a bellows in an alternate embodiment of the invention with an integral inner liner and integral outer shield where the outer shield has a cable or rod threaded through holes in the outer shield to provide a bellows' extension stop.

Referring to FIG. 2, rods or cables or threaded screws 170 can be threaded through holes in the outer shield 171 (formed by discs such as 150, 160), such as suggested in FIG. 1E, to provide NVH damping and/or extension limits. Extension limits set at the rods or cables 170 prevent the bellows from extending beyond the elastic limit of the design.

Figure 4:
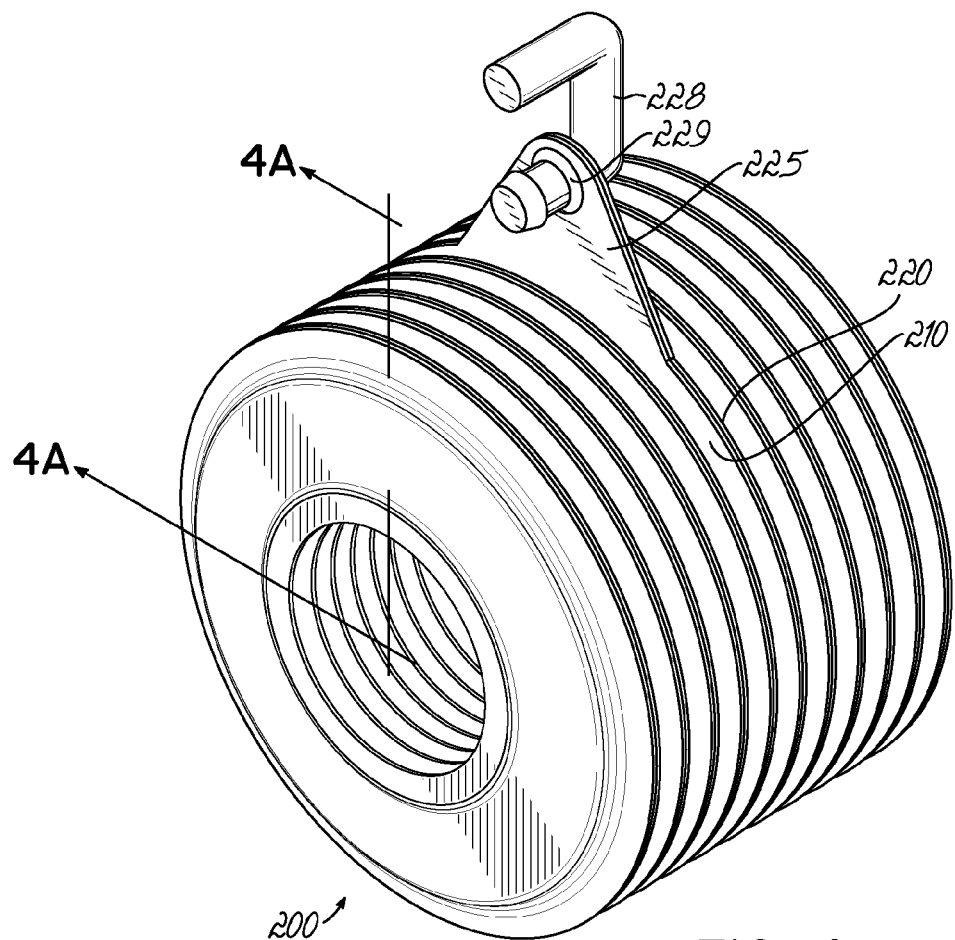
FIG. 4 is an isometric view of a bellows in an alternate embodiment of the invention with an integral mounting/hinge support, where one of the convolutions (any across the bellows can be selected depending on the application) has a special inner and outer disc defining the mounting feature.
Figure 4A:
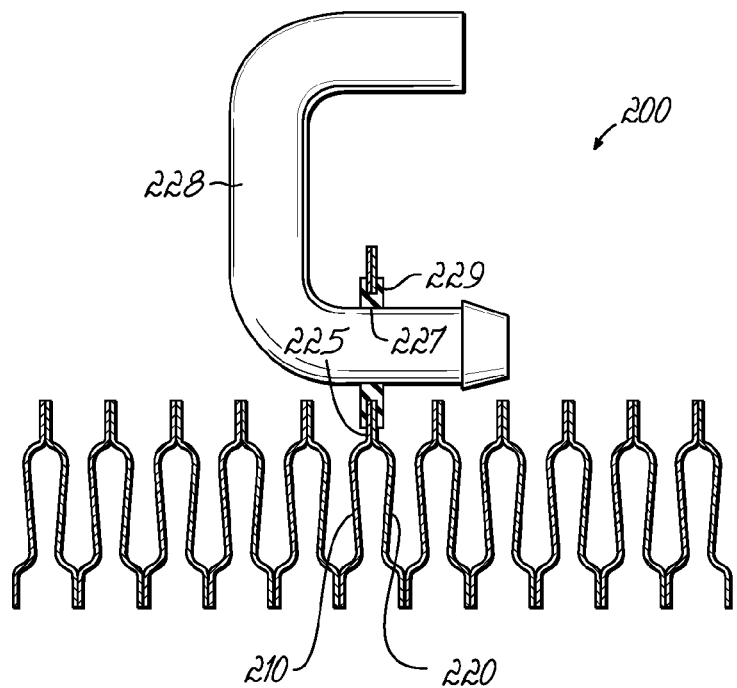
FIG. 4A is a cross-section of a bellows of FIG. 4 with an integral mounting/hinge support and showing the invention before bending of the integral inner liner and integral outer shield feature at FIG. 1A, excepting the mounting feature convolution.

In this regard, and with attention to FIG. 4A, the support 225 defines an aperture 227 for receiving a hanger 228 in an isolation grommet 229.

Figure 3:
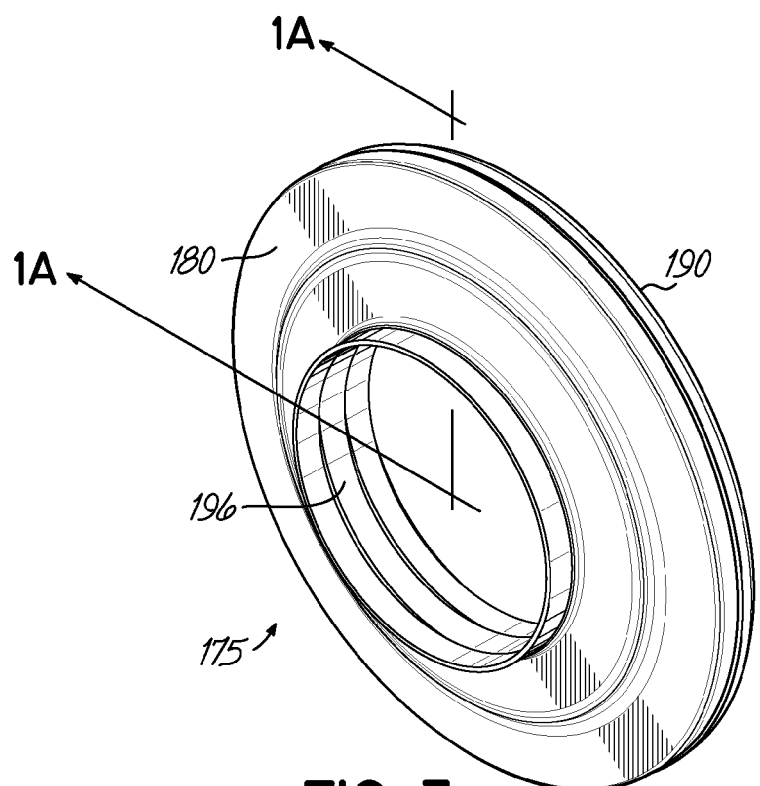
FIG. 3 is an isometric view of a bellows in an alternate embodiment of the invention with the integral inner liner and integral outer shield with a damping medium added between the convolutions and fixed by the outer shield to add damping properties to the bellows.
Figure 3A:
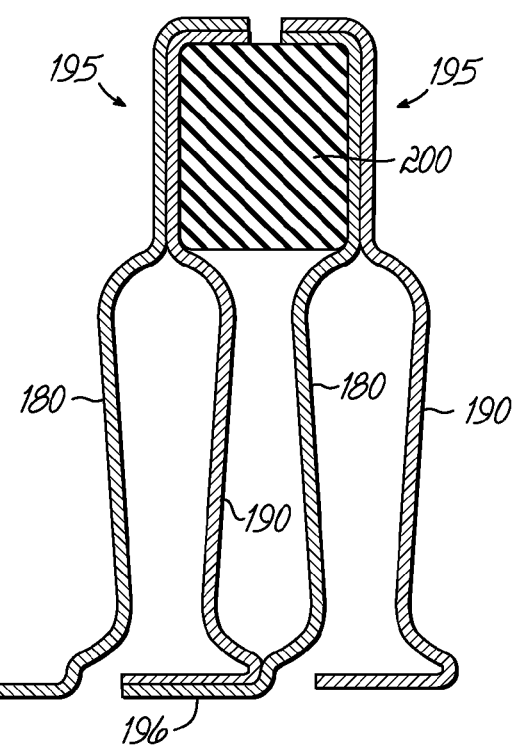
FIG. 3A is a cross-section along lines 3A-3A of a bellows of FIG. 3 with the integral inner liner and integral outer shield and a damping medium is added between the convolutions and fixed by the outer shield to add damping properties of the bellows.

Referring to the bellows 175 of FIGS. 3 and 3A, the inner disc 180 and outer disc 190 are constructed so that the outer shield 195 formed thereby defines a chamber which captures a damping medium 200 (such as mesh wire or a synthetic material) and provide damping properties of the bellows and between the convolutions illustrated. An integral inner shield 196 is formed by interior overlaps of discs 180, 190.

Referring to FIGS. 4 and 4A, the respective discs 210 and 220 of selected convolutions of bellows 200 can be designed with a feature to define a mounting/hinge support 225 as shown in one such case. The thickness of these discs can be different than the others on the bellows of selected convolutions. Also, this convolution can be located at any point along the bellows. The exact mounting configuration is dependent upon the application.

Another aspect of this invention includes consideration of and a solution to the interconnection of the elements and structures described above with relatively thicker wall connection pipes or components thereof found in, for example, an exhaust system.

More specifically, it will be appreciated that the foregoing flexible elements and bellows apparatus described above have particular applicability to, or use in, exhaust systems for internal combustion engines wherein the pipes or conduits of such systems (not shown), or their connecting structures, are relatively thicker than the members comprising the bellows components or stamping described above. In these and other cases, there is here consideration of how the flexible bellows invention described above are operably interconnected within such systems or to specific connection pipes or other exhaust components.

To this end, the invention further contemplates the combination to the bellows described above of end caps configured for welding or other attachment to the ends of the bellows and more particularly to the end bellows component, disc or stamping. The end caps are somewhat thicker than the bellows discs to facilitate welding both to the bellows and to much thicker conduits or pipe components of an exhaust system.

Figure 5:
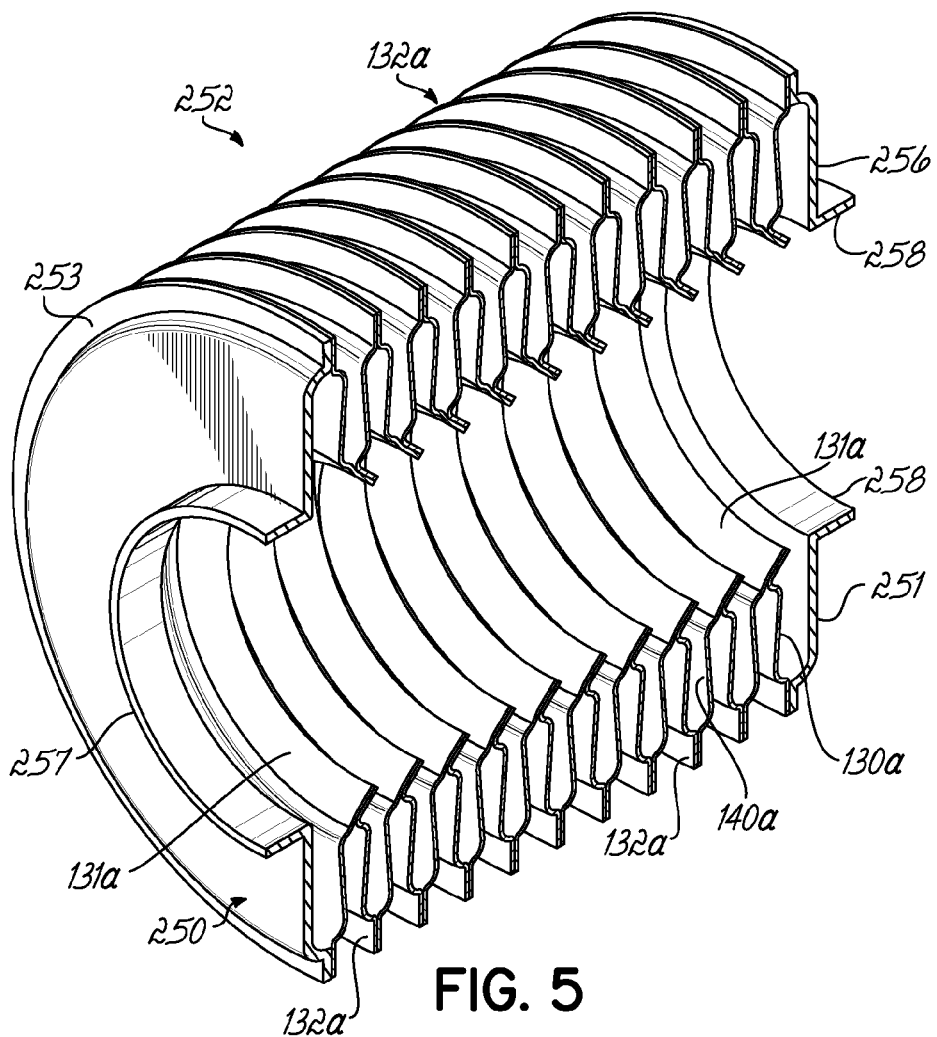
FIG. 5 is a perspective drawing illustrating the addition of end caps to an exemplary bellows unit.

This aspect of the invention is illustrated in FIGS. 5-8, where FIG. 5 illustrates in perspective the addition of end caps 250, 251 to a bellows 252, such as that illustrated previously in FIG. 1G, for example, but wherein the multiple ply flanges 132a are not formed over as are flanges 132 of FIG. 1G. Instead, the flanges are left extending radially outwardly as shown in FIG. 5. It will be appreciated that end caps 250, 251 each have a radial, outwardly extending flange 253, 254, a body 255, 256 and interior, axially extending cylindrical bosses 257, 258. Bodies 255, 256 at their outer portions generally correspond partially to the shape of the outer portions of alternative stampings 130a, 140a respectively as shown. Flanges 253, 254 are welded to the outward radial flanges 132a of the bellows. End caps 250, 251 are preferably thicker than stampings or discs 103a, 140a for example, but not so thick as to adversely affect their welding to the stampings. At the same time, cylindrical bosses 257, 258 are thick enough for welding to the end connections of pipes, tubes or conduits in an exhaust system, for example.

Figure 6:
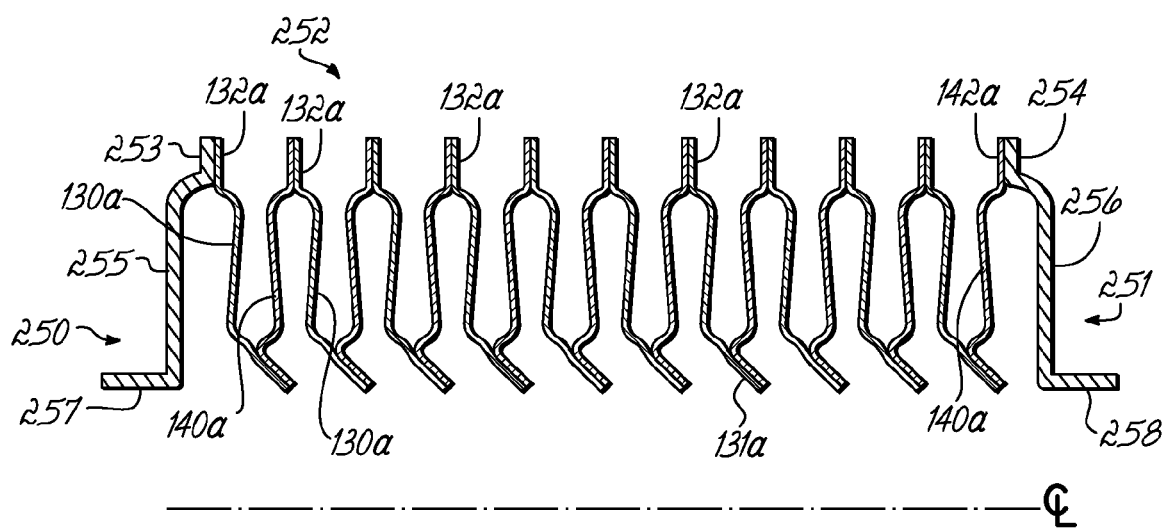
FIG. 6 is a cross-sectional view of a portion of a bellows with end caps as in FIG. 5.

Details of FIG. 5 are also shown in FIG. 6, wherein only the half of the bellows 252 and end caps 250, 251 are illustrated in side view cross-section as shown for clarity. The bellows 252 and end caps 250, 251 are developed about center line CL with inner liner flanges 131a extending inwardly as shown.

End caps somewhat similar to these as described are useful on flexible bellows of a variety of configurations as described above.

Figure 7:
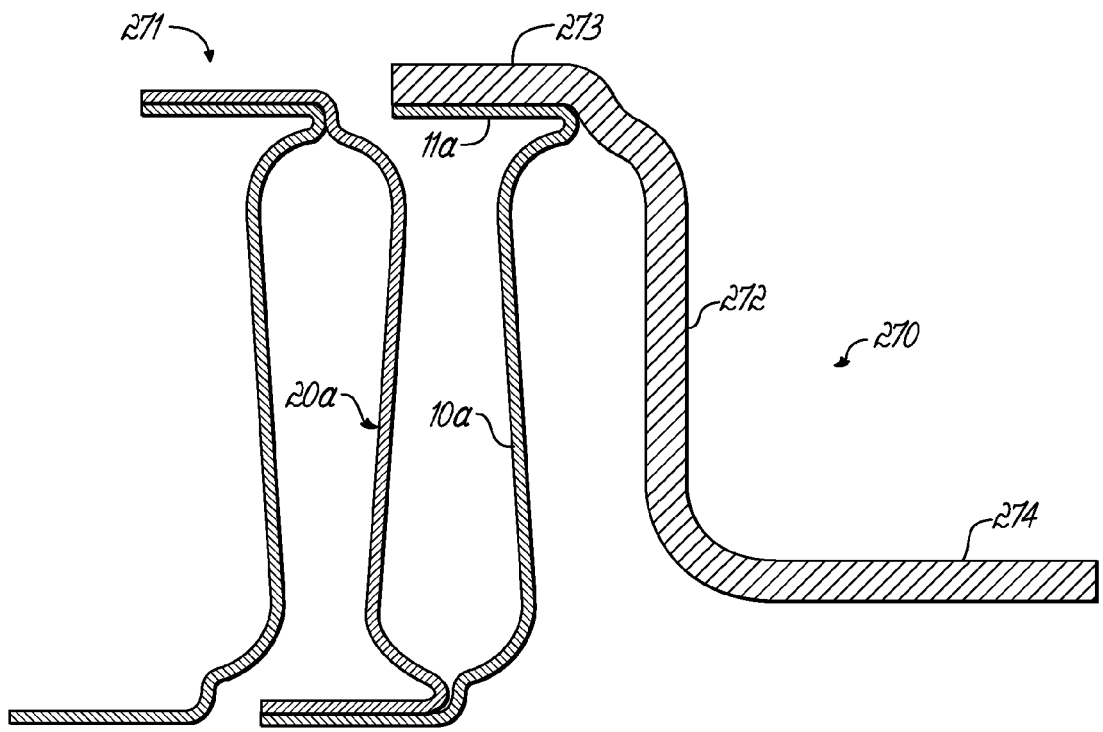
FIG. 7 is a cross-sectional view similar to FIG. 6 but of a portion of an alternate bellows with end cap.

For example, FIG. 7 illustrates an end cap 270 used with a bellows 271 of similar configuration to that shown in FIG. 1A. In FIG. 7, only one end cap 270 is shown in partial cross-section on the bellows 271, it being understood another end cap is used on the opposite end of the bellows 271.

In FIG. 7, end cap 270 has a body 272 configured at its upper end like bellows disc or stamping 20a, and a flange 273 along upper flange 11a of disc 10a. The end cap 270 has an interior, axially extending cylindrical boss 274 for connection to a pipe tubing or conduit of an exhaust system (not shown), for example.

The thickness of caps 270 is thicker than discs 10a, 20a, but not so much as to interfere with welding of flange 273 to flange 11a. In addition, its thickness facilitates its welding or connection into the thicker, more robust components of an exhaust system. For clarity, only a portion of bellows 271 end cap 270 are shown about center line CL, similar to FIG. 6.

Figure 8:
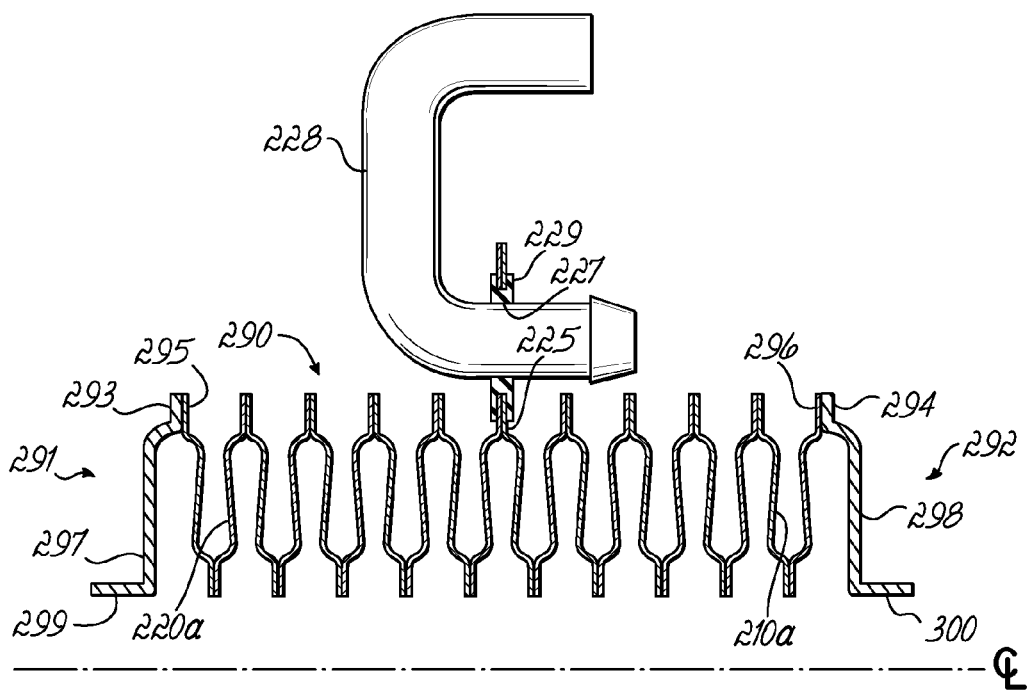
FIG. 8 is a cross-sectional view similar to FIG. 4A but showing the use of end caps in association with the bellows.

FIG. 8 illustrates a bellows 290 such as that bellows of FIG. 4A, but with end caps 291, 292 all developed about center line CL.

End caps 291, 292 have radially extending flanges 293, 294 welded respectively to flanges 295, 296 of bellows 290 as shown, with all flanges in this configuration extending radially outwardly from center line CL.

End caps 291, 292 have bodies 297, 298 formed at their upper ends like discs 220a and 210a, respectively, and interior, axially extending cylindrical bosses 299, 230 for interconnection to the components of an exhaust system, for example.

Other components are numbered and are like that of FIG. 4A.

In a yet further aspect of the invention, it will be appreciated that the outward extending flanges of the various bellows configurations of the embodiments described herein can be welded together, then fluted or splayed away from one another to present more surface area to the surrounding environment to promote cooling of the bellows and systems in which they are used. Thus, for example, the outward flanges shown in FIGS. 1A, 1C, 1E, 1F, 1G, 4A, 5, 6, 7 and 8 could be so arranged.

Figure 9:
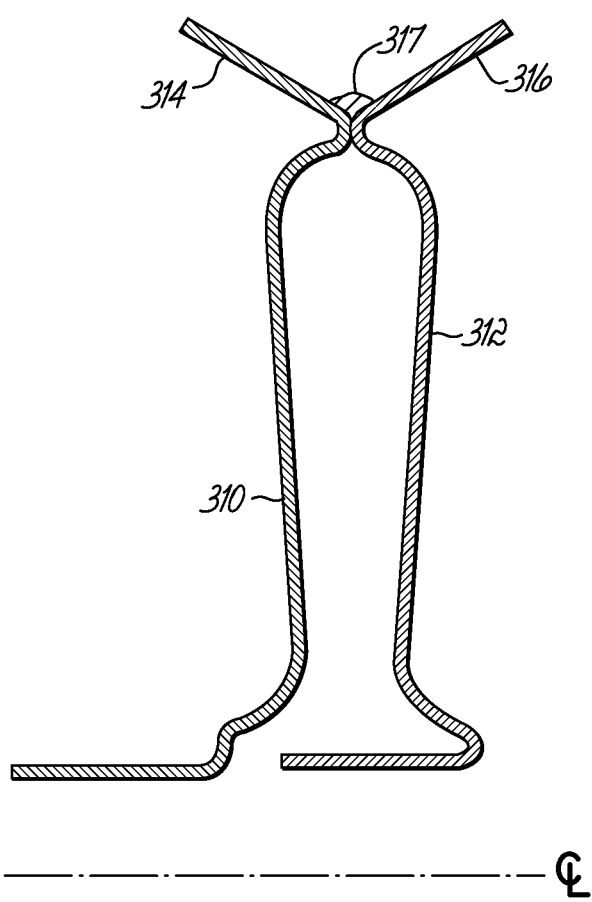
FIG. 9 is a cross-sectional view illustrating a modification of bellows-forming discs and their outer flanges to promote cooling.

FIG. 9 illustrates this aspect of the invention wherein is shown two discs 310, 312 defining a convolution of a multiple component bellows (such as those shown in various preceding FIGS.). Discs 310, 312 have outwardly extended, but splayed apart, flanges 314, 316 extending beyond weld 317 to present additional surface area exposed to the environment for cooling. Otherwise, the bellows and discs are similar to those described above.

ALTERNATIVE EMBODIMENTS

It will be appreciated that these above embodiments are typically oriented symmetrically about a centerline (CL) as shown in the FIGS. and which is essentially straight in a linear direction. Due to flexibility of the convolutions, however, it is appreciated that while these embodiments are essentially linearly extended when at rest, they provide a degree of flexibility when mounted between components of a system such as an exhaust system. Typically, such components to which the prior disclosed embodiments herein are connected are essentially coaxially oriented on a common axis, one to the other, with the embodiments herein so aligned on substantially the same axis or on an axis which is only slightly out of coaxial alignment only very slightly, wherein the inherent flexibility of the coupling herein sufficiently accommodates any slight misalignment.

Applicant has observed that on occasion, system components between which couplings re desired for mounting are misaligned to a greater degree than is desirable for application of a linear extended coupling (prior to any flexing bias) according to the foregoing, even if flexible as described. Accordingly, it is also desirable to provide a coupling with the advantages and performance characteristics of the foregoing couplings, yet developed about an axis which is not linear but is curved or bent in segments, and which readily accommodates system components which are not coaxially oriented but which have respective axes which, if extended, are at intersecting angles. While any such angles might be accommodated, axes intersecting at angles over zero degrees and up to about fifteen degrees or over are contemplated for application of alternative couplings as described below.

Accordingly, alternative embodiments of the invention comprise couplings oriented around a multiple elongated axes of about five to about fifteen degrees offset as will be described.

Such couplings include the performance characteristics of NVH damping as described in the foregoing embodiments, together with interior liners and/or external shields, and end caps for coupling, welding, etc.

As in the prior described couplings, the alternative couplings are also comprised of convolutions, each defined by two formed discs as noted above, but wherein at least one of the discs is asymmetric about the disc axis. That is one disc of a convolution may have one first lineal width or thickness in the axial direction on one side of the axis whereas the thickness of the same disc on another side of the axis is greater in a second width or thickness than the first thickness, rendering the disc in an asymmetric shape. While it is possible that both discs forming a single convolution of the coupling may be so asymmetrical, the preferred alternate embodiment will be formed with one or more convolutions wherein only one of the two discs forming each convolution is asymmetrical in width or thickness in the axially extended direction.

In addition, it will be appreciated that a particular system component may be configured in a way to facilitate interconnection or coupling to only one of the two structurally different discs of a coupling convolution. The alternate embodiments described herein accommodate interconnection into a system with either disc of a convolution attached directly to a system component.

Turning now to the details of alternate embodiments, attention is directed to FIGS. 10 through 11A and 13 through 13B, each of which illustrates couplings extending in an axial direction in a curvilinear or segmented path. It will be appreciated that like parts in FIGS. 10-11A and 13-13B are identified with like numbers throughout the embodiments.

Figure 10:
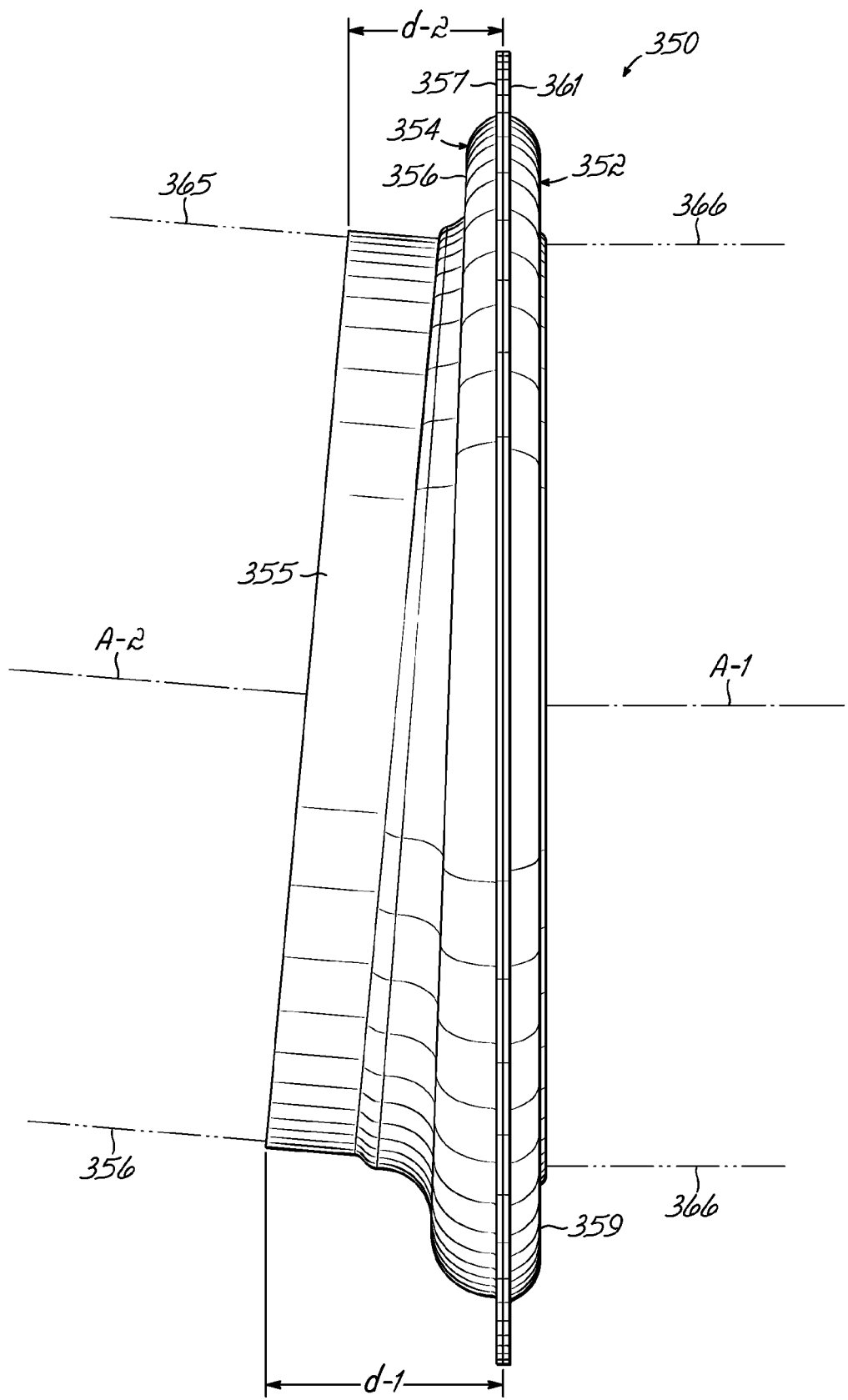
FIG. 10 is side view of an alternate embodiment of the invention depicting an angled coupling with a single loop convolution.

FIG. 10 depicts a single convolution coupling 350 providing a five degree "bend", one convolution coupling with outer weld and formed from a first uniform disc 352 (FIGS. 10A, 10B) and a second, asymmetrical disc 354 (FIGS. 10C, 10D). It will be appreciated that disc 352 of coupling 350 is generated symmetrically about an axis A-1 while disc 354 is generated about, or has a boss or flange 355 generated about, an axis A-2 which is extended axially in a direction parallel to axis A-2. This is produced by the asymmetric structure of disc 354 being deeper in width or thickness d-1 than the width or thickness d-2 on another side of axis A-2. Axis A-2 in this embodiment intersects axis A-1, when extended, at about five degrees from axis A-1.

Figure 10E:
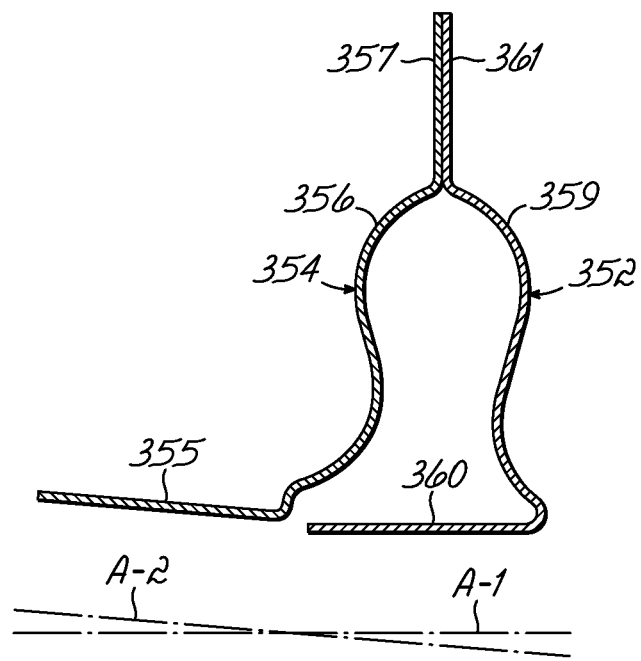
FIG. 10E is a cross section illustrative view similar to FIGS. 10B, 10C, but of one full convolution of the invention of FIG. 10.

Disc 354 includes a shaped radial portion 356 (FIG. 10E), a radially outwardly extending outer flange 357 and an inner flange 355; these elements being illustrated in the enlarged detail shown in FIGS. 10D, 10E. Disc 352 includes a shaped radial portion 359, an inner flange 360 and a radially outwardly extending outer flange 361. Flange 360 is preferably parallel to axis A-1 while flange 355 of disc 354 is preferably parallel with axis A-2. Flange 355 is about 5 degrees out of alignment with flange 360. In coupling 350, flanges 357 and 361 are welded together, thus providing an "outer" weld.

Coupling 350 is particularly useful when used between two system components on respective axes about five degrees out of coaxial alignment. Such components are shown in phantom at lines 365, 366 in FIG. 10 for illustration purposes only.

Figure 12:
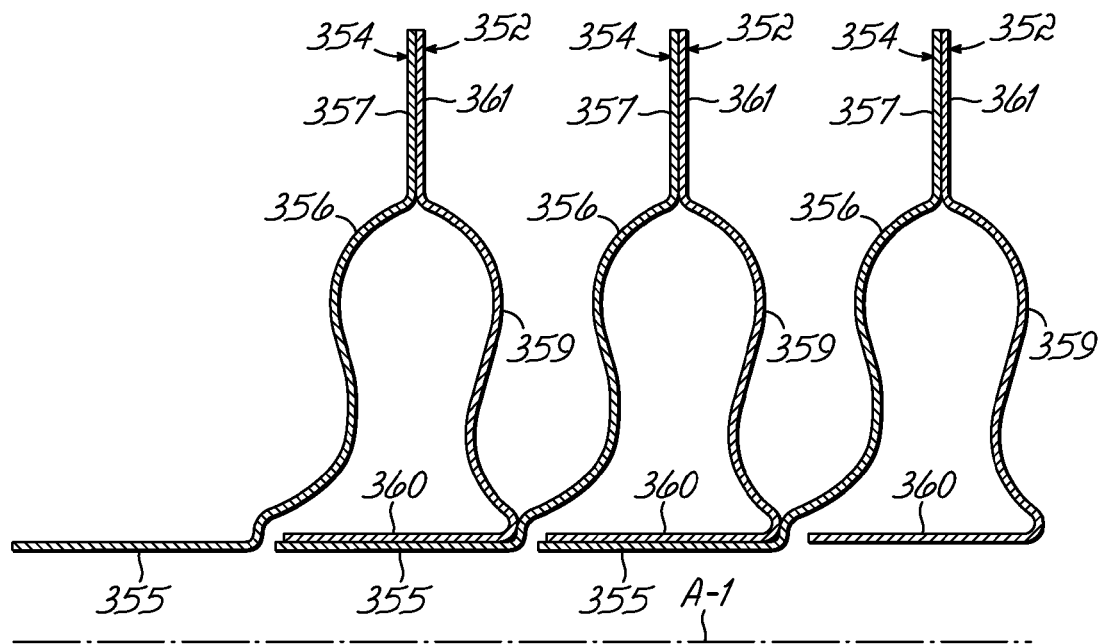
FIG. 12 is a cross section illustrative view similar to FIG. 10E, but of one convolution of an alternate embodiment of the invention of FIGS. 1-10, similar to FIG. 1A but showing three convolutions, for example, prior to outer flange bending.

It will be appreciated that symmetrical couplings such as shown in FIGS. 1-9 could be used in conjunction with coupling 350 when extended coupling length is desired. See FIG. 12 illustrating a cross-section of additional convolutions formed along coaxially and about axis A-1.

Figure 11A:
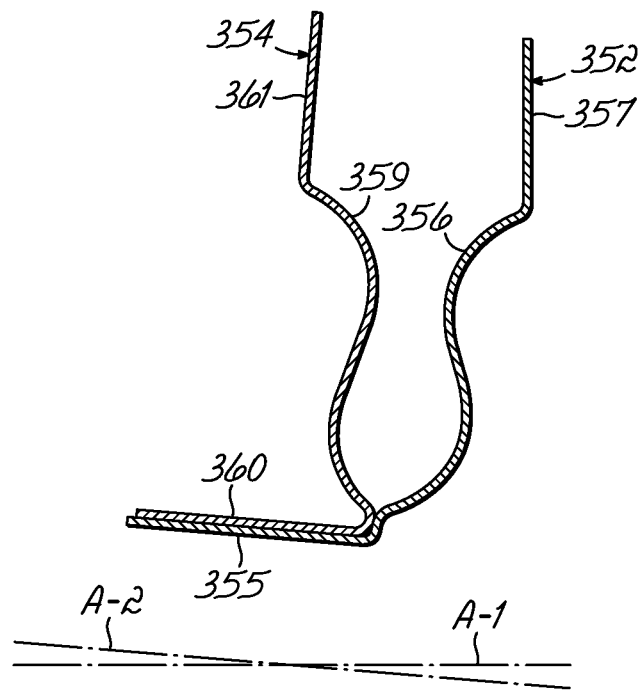
FIG. 11A is a cross section illustrative view somewhat similar to FIG. 10E, but of one convolution of the coupling of FIG. 11.
Figure 11:
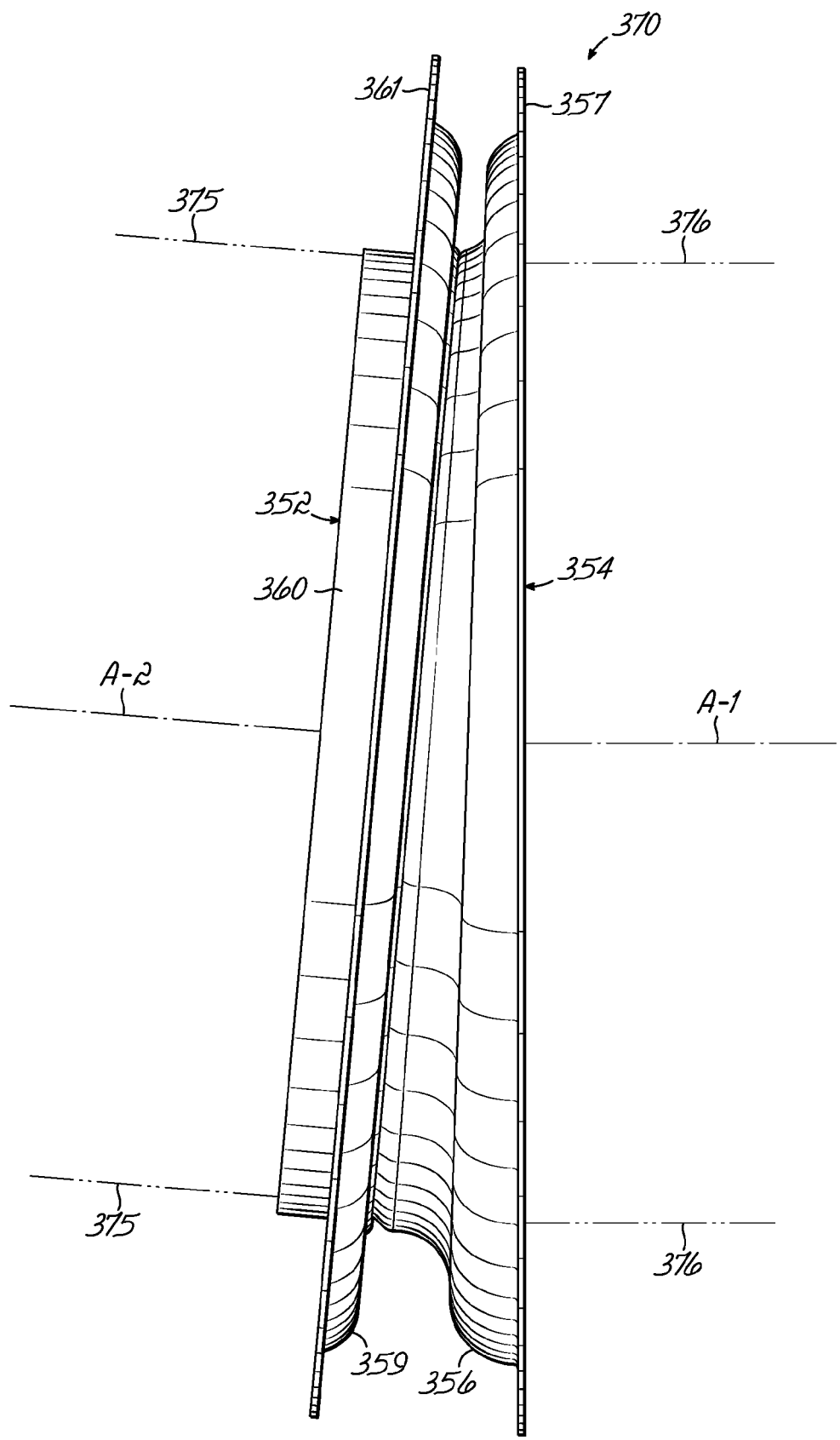
FIG. 11 is a side view of an alternate embodiment of the invention depicting a different angled coupling with a single loop convolution.

Turning now to FIG. 11, there is depicted a five degree, one convolution coupling 370 with inner weld, also formed from a first uniform disc 352 and a second asymmetrical disc 354. However, the discs are reversed in position from their combination shown in FIG. 10 with asymmetric disc 354 on the right-hand side (as shown) of symmetric disc 352. In this regard, the flanges 357 and 361 are not disposed in abutment with each other as in FIG. 10, but rather are spaced apart. Nevertheless, interior flanges 355, 360 are in this embodiment in abutting relation and can be welded together forming the coupling 370 as shown.

Accordingly, disc 352 is centered symmetrically about axis A-2 while disc 354 is asymmetrically formed about axes A-1, A-2. The respective axes A-1, A-2 are slightly offset by an angle for example, of five degrees from being coaxial, so the coupling defines a stepped coupling for offset axes. This offset accommodates an axial offset of about five degrees between system components 375, 376 (shown in phantom) which coupling 370 is used to couple together. As noted for the embodiment of FIG. 10, the coupling 370 can be extended axially through the use of further discs such as uniform discs 352 where the length of coupling 370 need be extended. In this regard, the convolutions are partially formed by the inner weldings of adjacent inner flanges 355, 360.

Figure 13A:
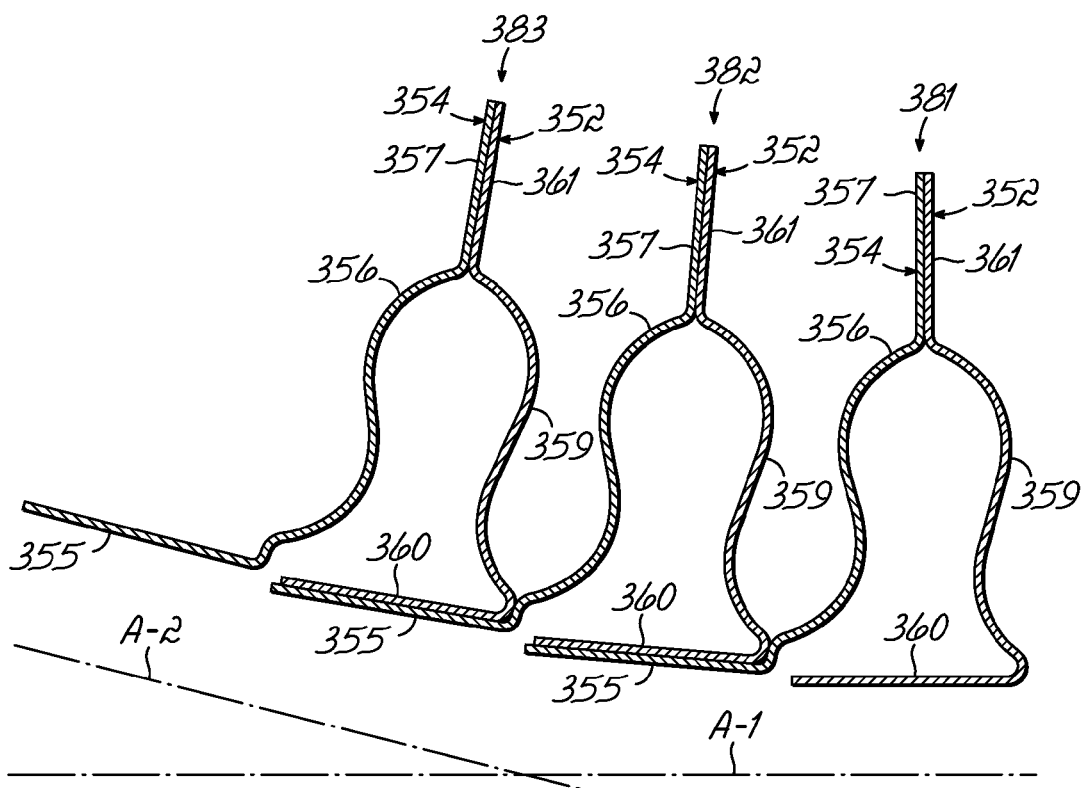
FIG. 13A is a cross section illustrative view similar to FIG. 10E, but showing three convolutions of the invention of FIG. 13; and, FIG. 13B is a cross section illustrative view similar to FIG. 13A, but of the three convolutions on the opposite side of axes A-1, A-2 of the invention of FIG. 13.
Figure 13:
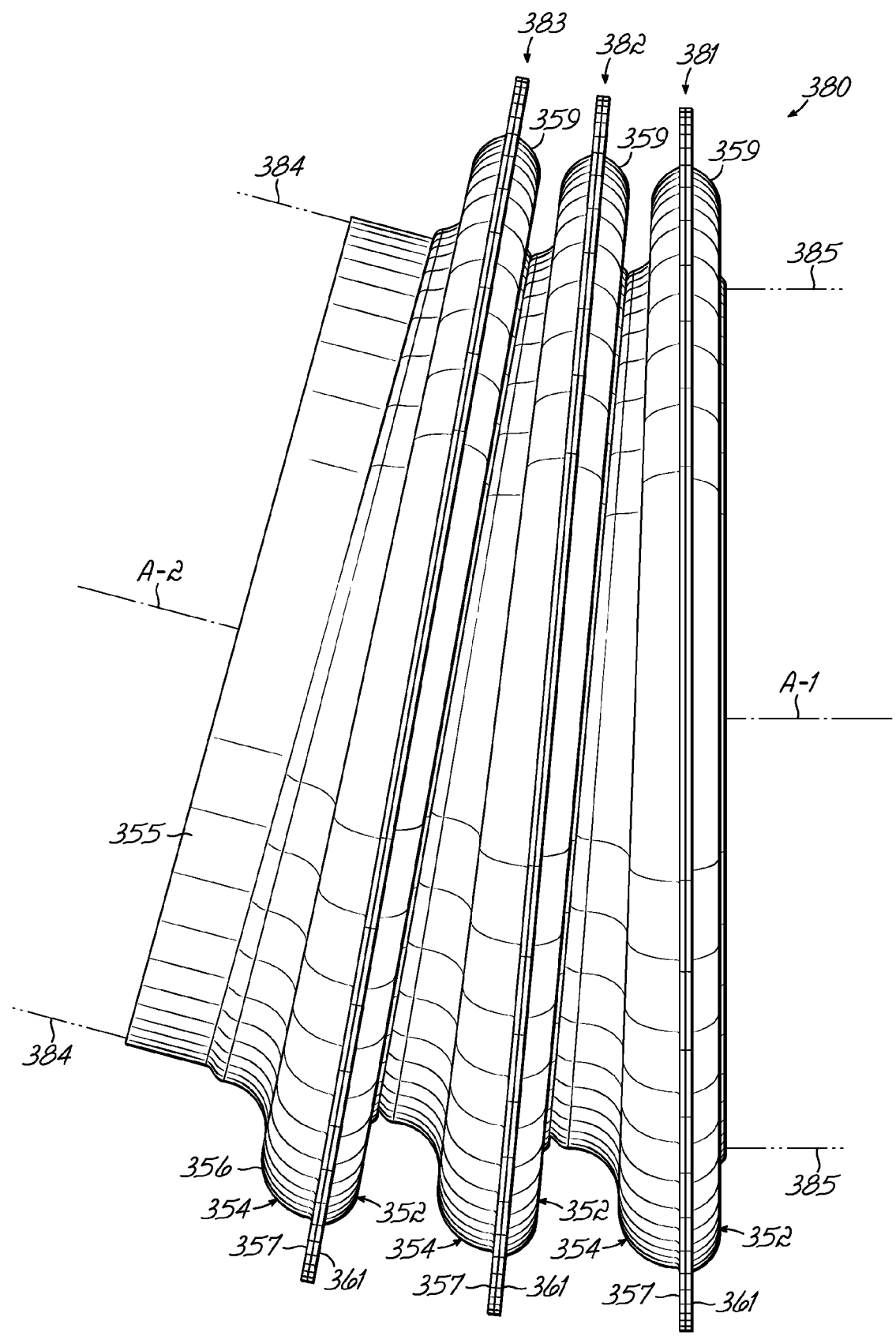
FIG. 13 is side view of an alternate embodiment of the invention depicting a triple loop convolution coupling providing a fifteen degree bend.
Figure 13B:
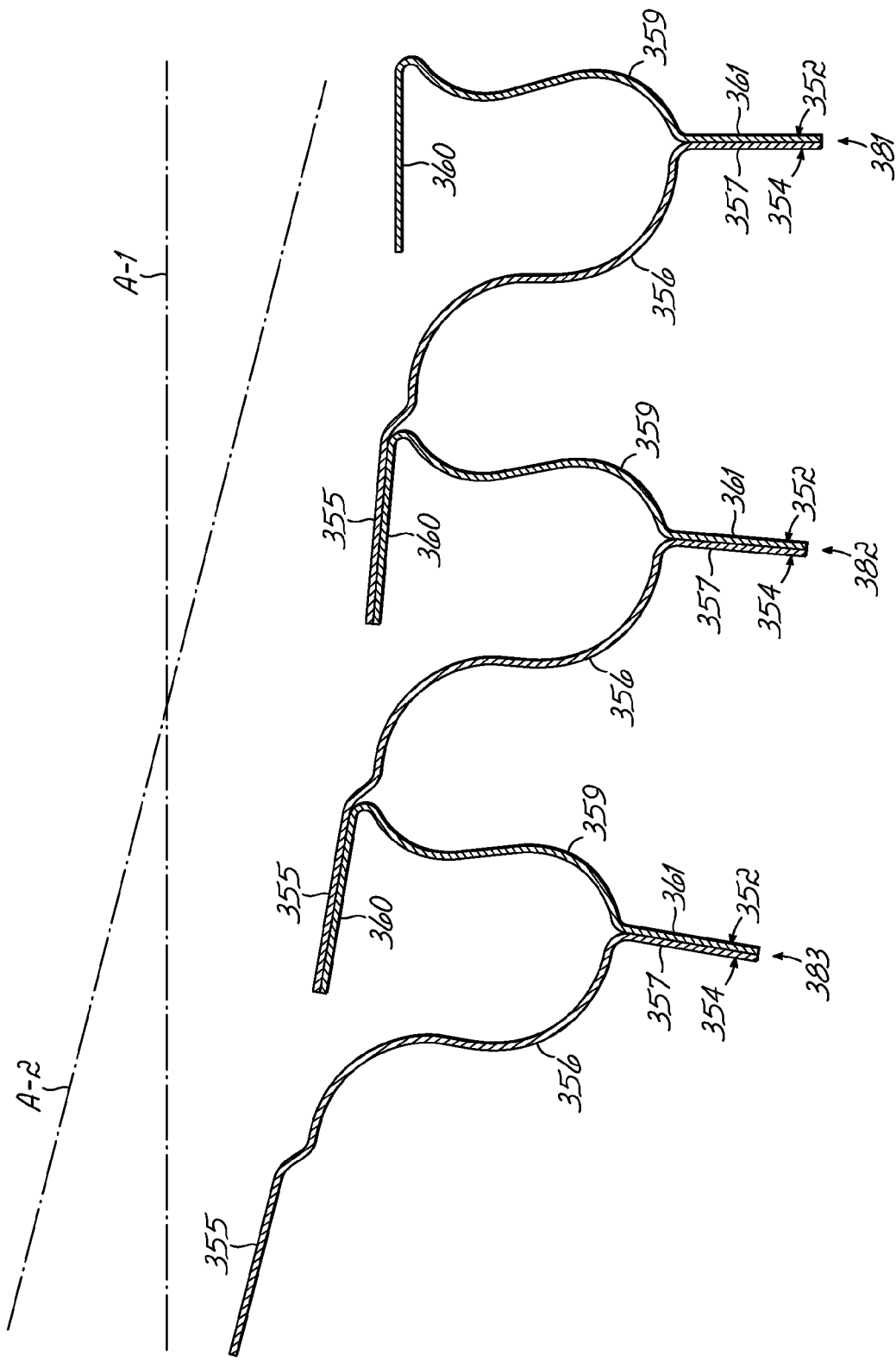

FIGS. 13, 13A and 13B illustrate a yet further embodiment somewhat similar to that of FIGS. 10 and 11, excepting three FIGS. 13, 13A, 13B show a fifteen degree, three convolution, outer weld coupling 380.

In this embodiment, use of three convolutions 381, 382, 383 accommodates a fifteen degree offset between respective axes A-1 and A-2 between system components 384, 385 (shown in phantom) which coupling 380 couples together.

In this embodiment, each convolution is defined by respective formed discs 352, 354, such that each convolution forms a further five degree increment of axis offset. Each asymmetric width or thickness d-1 compared to d-2 (FIG. 10) on each side of axis A-2 produces the fifteen degree axial offset. FIG. 13B simply illustrates in cross-section a combination of convolution of coupling 380 on the other side of axes A-1, A-2, etc.

It will be appreciated that in the event of a multiple convolution coupling as in FIGS. 13-13B, each convolution formed by a uniform and an asymmetric disc produces an accumulating axial offset in segments such that while axes A-1 and A-2 are shown in FIGS. 13-13B, axis A-2 represents diagrammatically the final exiting axis from the coupling compared to axis A-1 for clarity; there are intermediate axis configurations defined by each asymmetric convolution. So in FIG. 13B, for example, convolution 381 may define a first five degree offset, coupling 382 a second five degree offset and coupling 383 a third five degree offset for a total of a fifteen degree offset between first axis A-1 and final axis A-2.

In this embodiment of FIGS. 13-13B, flanges 355, 360 are welded in assembly to form the inner liner as shown. And like the embodiments of FIGS. 10-12, additional convolutions formed of integral discs can be used to extend the length of coupling 380 as desired.

Moreover, it will be appreciated that multiples of convolutions shown in the FIGS. can be used to produce more or less angular axial offset that five or fifteen degrees shown as examples here. It will also be appreciated that while the alternative couplings described herein may be referred to as presenting "curved" or curvilinear couplings, the offsets may be in the cumulative addition of angular "steps" or segments provided by each asymmetric disc or convolution.

Moreover, while the illustrations in FIGS. 10-11A and 13-13B show direction orientations from one axis to the other in the same direction, the asymmetric discs could be rotated with respect to each other, where desired, to compensate for axially offset system components, whose final axes are parallel but not coaxial such as in an "S" or "Z" shaped orientation, or other component offsets.

It should also be appreciated that the outer flanges 357, 351 and/or the inner flanges 355, 360 define or can be bent to define respective outer shields or inner liners for the couplings.

Each coupling in FIGS. 10-14 provides similar advantages of dampening and reduction in NVH, while not only providing flexibility resulting from the respective convolutions forming the bellow of each coupling, but also conforms statically (without flex) to misaligned system components with which the couplings are used.

It will be appreciated the asymmetric discs of FIGS. 10-11A and 13-13B could be formed to provide offset at angles other than five degrees and thus provide a large potential number of couplings defining static (unflexed) couplings for a variety of applications.

These and other alternatives, modifications and advantages will become readily apparent to those of ordinary skill in the field to which this invention pertains without departing from the scope of the invention, and applicant intends to be bound only by the claims appended hereto.

What is claimed is:

1. An angled flexible coupling for fluid conduits wherein a first conduit has a first central axis and a second conduit has a second central axis, said second central axis being oriented at an angle to said first central axis, such that first and second axes are not parallel nor concentric with respect to each other, and said coupling, including:
    a plurality of discs;
    each disc having a rim portion configured to define at least a portion of one of an integral inner liner or an integral outer shield;
    first and second discs in said plurality of discs operably connected together to form at least one convolution defining an internal passage for operable connection between a plurality of fluid conduits;
    said first disc of a convolution formed about one axis and having a uniform width in an axial direction along said one axis;
    said second disc formed about another axis disposed at an angle to said one axis and having a non-uniform width along an axial direction with respect to said other axis,
    said one axis of said first disc being parallel to said first central axis of said first conduit, said other axis of said second disc being parallel to an axis of another first disc.

2. A coupling as in claim 1 wherein said convolution has an entry axis and an exit axis offset from said entry axis on an angle greater than zero degrees.

3. A coupling as in claim 2 comprising:
a bellow defined by a plurality of convolutions;
each convolution comprising two formed discs having spaced apart portions and having flange portions connected together;
said flange portions forming one of a shield or a liner, integral with said bellows.

4. A coupling as in claim 3 wherein said flange portions extend radially outward of said convolutions.

5. A coupling as in claim 4 wherein said flange portions extend in an axial direction with respect to said bellows and define said shield.

6. A coupling as in claim 3 wherein said flange portions are disposed inwardly within said bellows.

7. A coupling as in claim 6 wherein said flange portions extend axially within said bellows and forming a liner.

8. A coupling as in claim 2 wherein said discs have external and internal flanges.

9. A coupling as in claim 8 wherein one of the external flanges of adjacent discs on the internal flanges of adjacent discs are welded together.

10. A coupling as in claim 8 wherein said convolution is formed of first and second discs having external flanges welded together.

11. A coupling as in claim 8 wherein said convolution is formed by first and second discs having internal flanges welded together.

12. A coupling as in claim 2 wherein said coupling is defined by one of said convolutions.

13. A coupling as in claim 2 wherein said coupling is defined by a plurality of convolutions.

14. A coupling as in claim 8 wherein said external flanges are welded together and said internal flange forms an inner lining in said coupling.

15. A coupling as in claim 8 wherein said external flanges are spaced apart one from the other and said internal flanges are welded together and from an inner lining in said coupling.

16. A fluid coupling for operatively coupling ends of two fluid conduits, each having a central axis wherein said axes are non-parallel and are at an angle with respect to each other, said coupling comprising:
at least one convolution;
said convolution comprising first and second discs;
one of said discs being of uniform width along a first central axis thereof;
another of said discs being of non-uniform width along a second central axis thereof extending at an angle with respect to said first central axis.

17. A fluid coupling as in claim 16 wherein said one disc is operatively connected to a first one of said two fluid conduits and a first central axis of said one disc being parallel to and co-axial with the central axis of said first one of said fluid conduits.

18. A fluid coupling as in claim 17 wherein said coupling includes a plurality of said convolutions wherein:
one of said other of said discs on non-uniform width in a convolution is operatively connected to a second one of said fluid conduits and the second central axis of said other disc is parallel to a central axis of said second one of said fluid conduits.

19. A fluid coupling for operatively coupling together respective ends of two fluid conduits wherein said respective conduits have respective central axes oriented at a non-parallel angle with respect to each other, said coupling comprising at least one convolution comprising: a first disc of uniform width; and a second disc of non-uniform with operatively secured to said first disc, wherein said first disc of uniform width has a central axis parallel to a respective central axis of one of said fluid conduits; and said second disc of non-uniform width has a central axis parallel to a respective central axis for another respective fluid conduit.

* * * * *

UNITED STATES PATENT AND TRADEMARK OFFICE
CERTIFICATE OF CORRECTION

PATENT NO. : 8,424,922 B2
APPLICATION NO. : 12/693620
DATED : April 23, 2013
INVENTOR(S) : Paul Chahine et al.

Page 1 of 1

It is certified that error appears in the above-identified patent and that said Letters Patent is hereby corrected as shown below:

In the Specification:
Column 1, lines 13-14, "Applicant claims" should be ---Applicants claim---.
Column 1, line 36, "(hereinafter NVH) are produced" should be ---(hereinafter NVH) produced--.
Column 1, line 62, "constrains" should be ---constrain---.
Column 2, lines 1-2, "all components: bellows, outer shield, and/or inner liner, mount/hinge)" should be ---all components (bellows, outer shield, and/or inner liner, mount/hinge)---.
Column 3, line 2, "lines" should be ---line---.
Column 3, line 39, "lines" should be ---line---.
Column 3, line 65, after the word "is" insert --a--.
Column 4, line 22, after the word "is" insert --a--.
Column 5, line 4, "create" should be ---creates---.
Column 5, line 6, "form" should be ---forms---.
Column 5, line 47, "are" should be ---is---.
Column 6, line 30, "are" should be ---is---.
Column 7, line 17, "are" should be ---is---.
Column 8, line 1, "Applicant has" should be ---Applicants have---.
Column 8, line 2, "re" should be ---are---.
Column 8, line 17, after the word "around" delete "a".
Column 10, line 8, "that" should be ---than---.
Column 10, line 39, "applicant intends" should be ---applicants intend---.
In the Claims:
Column 11, line 37, "from" should be ---form---.
Column 12, line 19, "on" should be ---of---.
Column 12, line 29, "with" should be ---width---.

Signed and Sealed this
Twenty-eighth Day of June, 2016

Michelle K. Lee
*Director of the United States Patent and Trademark Office*